(12) United States Patent
Hashimoto

(10) Patent No.: US 11,315,054 B2
(45) Date of Patent: Apr. 26, 2022

(54) COMMUNICATION SYSTEM, COMMUNICATION METHOD, AND INFORMATION PROCESSING APPARATUS

(71) Applicant: Ricoh Company, Ltd., Tokyo (JP)

(72) Inventor: Takahiro Hashimoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/352,888

(22) Filed: Mar. 14, 2019

(65) Prior Publication Data
US 2019/0303827 A1 Oct. 3, 2019

(30) Foreign Application Priority Data
Mar. 30, 2018 (JP) .............................. JP2018-070389

(51) Int. Cl.
*G06Q 10/06* (2012.01)
*G06Q 10/02* (2012.01)
*G06Q 10/10* (2012.01)

(52) U.S. Cl.
CPC ....... *G06Q 10/06314* (2013.01); *G06Q 10/02* (2013.01); *G06Q 10/1095* (2013.01)

(58) Field of Classification Search
CPC .............. H04L 12/18; G06Q 10/06314; G06Q 10/02; G06Q 10/1095
See application file for complete search history.

(56) References Cited

U.S. PATENT DOCUMENTS

| 9,160,746 | B2* | 10/2015 | Adderly | ................ H04L 67/141 |
| 2005/0287998 | A1* | 12/2005 | Tonouchi | ........... H04L 12/1813 455/416 |
| 2009/0210490 | A1* | 8/2009 | Hawkins | ............... G06Q 10/10 709/204 |
| 2011/0283345 | A1* | 11/2011 | Kamei | .................... G06F 21/34 726/5 |

(Continued)

FOREIGN PATENT DOCUMENTS

| JP | 2004-173198 | 6/2004 |
| JP | 2009-175842 | 8/2009 |

(Continued)

OTHER PUBLICATIONS

"Stick PC", retrieved from Wikipedia on Jul. 28, 2020 (Year: 2020).*

(Continued)

*Primary Examiner* — Jonathan G Sterrett
(74) *Attorney, Agent, or Firm* — Xsensus LLP

(57) ABSTRACT

A communication system includes a first information processing apparatus for holding reservation information of a facility in association with information to be used at the facility; and a device that is provided in the facility and communicable with the first information processing apparatus. The communication system includes circuitry configured to: receive identification information of the reservation information and a notification indicating start of use of the facility from the device provided in the facility; in response to receiving the notification indicating start of use of the (Continued)

facility, transmit the information, which is requested from the device provided in the facility and corresponds to the reservation information identified by the received identification information, to the device provided in the facility; request the first information processing apparatus for the information to receive the information; and display the received information.

10 Claims, 11 Drawing Sheets

(56) References Cited

U.S. PATENT DOCUMENTS

| | | | |
|---|---|---|---|
| 2012/0218596 | A1 | 8/2012 | Hashimoto |
| 2014/0019859 | A1 | 1/2014 | Hashimoto |
| 2014/0074537 | A1* | 3/2014 | Bargetzi ............ G06Q 10/02 705/7.19 |
| 2014/0253939 | A1 | 9/2014 | Hashimoto |
| 2014/0333948 | A1 | 11/2014 | Hashimoto |
| 2016/0085768 | A1 | 3/2016 | Hashimoto |
| 2016/0216975 | A1 | 7/2016 | Hashimoto |
| 2017/0006162 | A1* | 1/2017 | Bargetzi ............ H04W 4/06 |
| 2018/0088883 | A1 | 3/2018 | Hashimoto |
| 2018/0145840 | A1* | 5/2018 | Advani ............ H04L 51/32 |

FOREIGN PATENT DOCUMENTS

| | | |
|---|---|---|
| JP | 2010-049456 | 3/2010 |
| JP | 2017-045093 | 3/2017 |
| JP | 2017-130760 | 7/2017 |

OTHER PUBLICATIONS

The Micro Check-in Framework for the Next Generation of Location-based Applications S Kacha—2012—digitalcommons.calpoly.edu (Year: 2012).*
Using Networked Technologies to support conferences. In: EUNIS 2005 Conference Proceedings, Jun. 1, 2005. Link to official URL (if available),B Kelly, E Tonkin, PShabajee—2005—academia.edu/, (Year: 2005).*
"How to add a hyperlink to a powerpoint presentation", iSpringSolutions.com blog of Apr. 22, 2016. (Year: 2016).*
"Meetoo—5 Top Tips to use in 2016", Customer Success Guide, retrieved from the web at https://www.slideplayer.com/slide/13269104/ (Year: 2016).*
Types of Hyperlinkswww.uwyo.edu > frontpage > lesson 13_hyperlinksPDF May 5, 2006 http://www.uwyo.edu/cessuptmedia/tipsheets/frontpage/lesson13_hyperlinks.pdf (Year: 2006).*

* cited by examiner

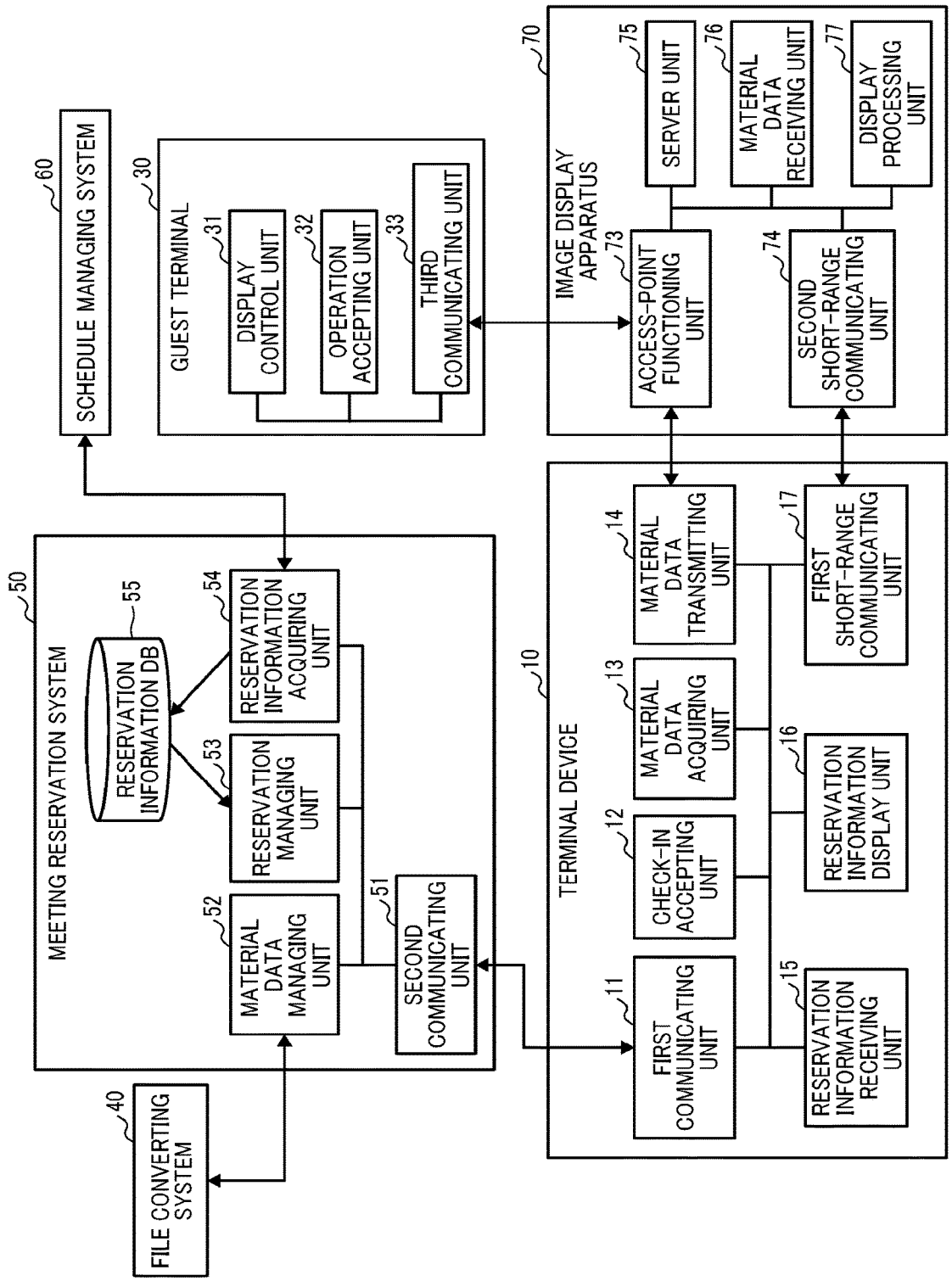

502 — FEEDBACK

DETAILS

MEETING NAME
[ MEETING ROOM A [X] ] — 503
ADD LOCATION OR MEETING ROOM

START
2018/01/25 (THU) [▶] 20:30 [▶]  □ ALL DAY
END                                                  } 505
2018/01/25 (THU) [▶] 21:00 [▶]  □ CLOSED
○ TIME ZONE ˅                                     506
☑ POLL ON MEETING TIME
   PLEASE PROPOSE SEVERAL CANDIDATE DATES AND TIMES FOR POLL BY PARTICIPANTS

REPEAT                         SAVE IN CALENDAR
NO                      [▶]    CALENDAR       [▶]
ALARM                          SHARING METHOD
5 MINUTES               [▶]    HAVE PLAN      [▶]

📎 sample.doc — 504
   2KB

NOTE
[                                           ] — 507

CONTACT                                  ౭ 🗓

[ MANDATORY ˅  ADD USER            ]
  😊 ZZZ
      VACANT TIME                             ☑ REQUEST
                                                 FOR REPLY
PARTICIPANTS
SORT ˅                                          } 508
 Ⓐ A
    VACANT TIME                                  ✕
 Ⓑ B
    VACANT TIME                                  ✕
 Ⓒ C
    VACANT TIME                                  ✕

FIG. 6

| ITEM | EXAMPLE |
|---|---|
| MEETING ROOM ID | Room1@domain.co.jp |
| EVENT ID | 550e8400-e29b-41d4-a716-446655440000 |
| PERSON WHO MAKES RESERVATION | AAA@domain.co.jp |
| REMINDER NOTIFICATION DESTINATION | XXXXXXxXXXXXXXXXXX |
| MEETING START TIME | 2017-04-14T09:00:00 |
| MEETING END TIME | 2017-04-14T09:30:00 |
| TITLE | Weekly Team Meeting |
| ATTACHMENT FILE INFORMATION | http://xxxx.ddd.com/sample.doc |
| MEETING STATUS | WAIT FOR CHECK-IN |
| TIME UNTIL AUTOMATIC CANCELLATION | 300 SECONDS |
| CODE NUMBER | 1234 |

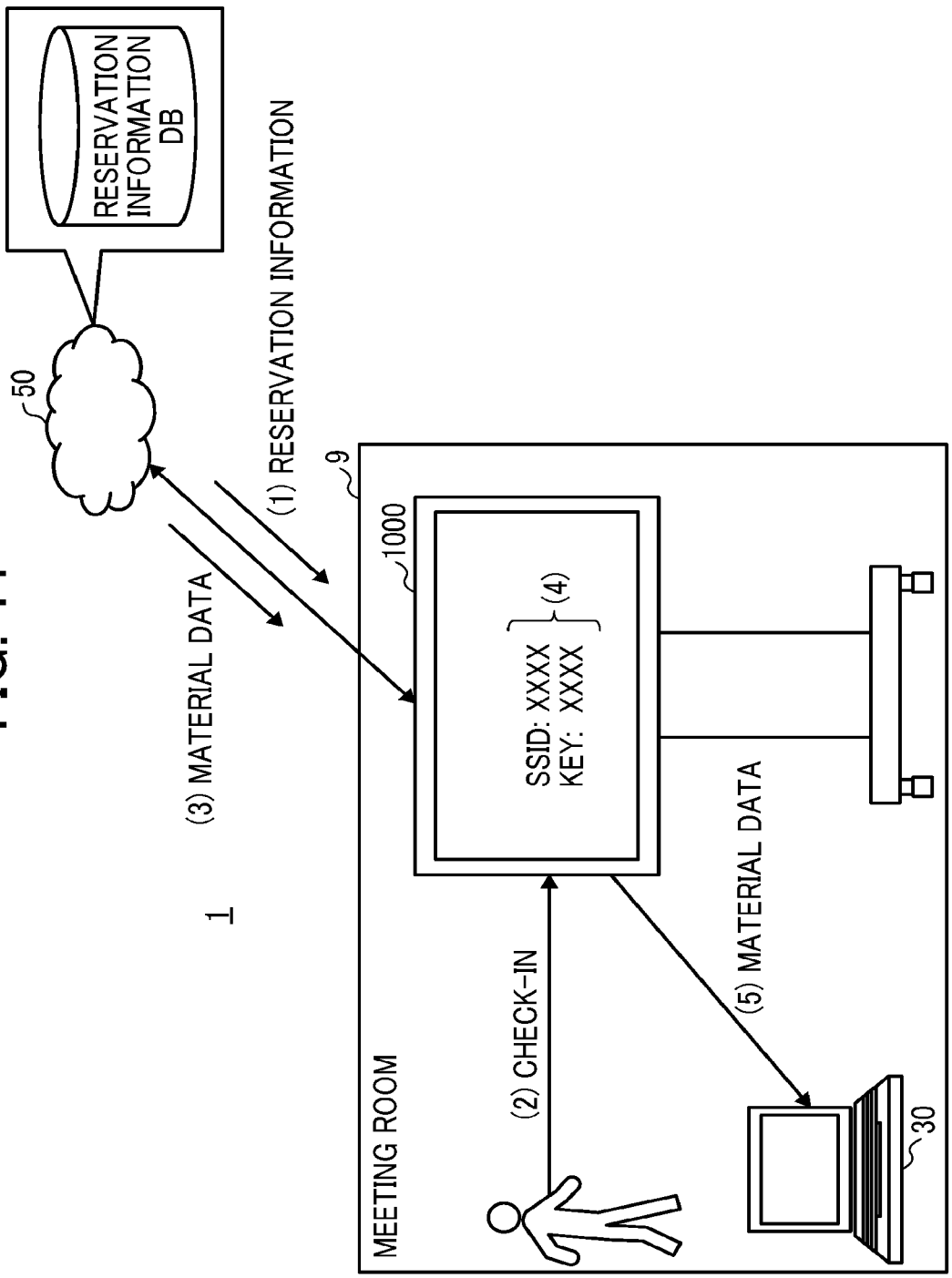

COMMUNICATION SYSTEM, COMMUNICATION METHOD, AND INFORMATION PROCESSING APPARATUS

CROSS-REFERENCE TO RELATED APPLICATIONS

This patent application is based on and claims priority pursuant to 35 U.S.C. § 119(a) to Japanese Patent Application No. 2018-070389, filed on Mar. 30, 2018, in the Japan Patent Office, the entire disclosure of which is hereby incorporated by reference herein.

BACKGROUND

Technical Field

The present disclosure relates to a communication system, a communication method, and an information processing apparatus.

Description of the Related Art

In a facility such as a meeting room, participants often share material data while making discussions. Conventionally, each of the participants prints out the material data and brings the printed data to share the material data. In another example, the material data is shared by projecting the material data from a participant's personal computer (PC) by using a projector.

Further, a technique is known according to which a terminal device is provided in a meeting room and material data to be used in a meeting is transmitted to the terminal device by the participant before a start of the meeting. This allows the meeting participants to print out the material data after the start of the meeting as need, and thereby saving the meeting participants from having to print out the material data in advance.

SUMMARY

According to an embodiment of the present disclosure, a communication system includes a first information processing apparatus for holding reservation information of a facility in association with information to be used at the facility; and a device that is provided in the facility and communicable with the first information processing apparatus. The communication system includes circuitry. The circuitry receives identification information of the reservation information and a notification indicating start of use of the facility from the device provided in the facility. In response to receiving the notification indicating start of use of the facility, the circuitry transmits the information, which is requested from the device provided in the facility and corresponds to the reservation information identified by the received identification information, to the device provided in the facility. The circuitry requests the first information processing apparatus for the information to receive the information. The circuitry displays the received information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 is a block diagram illustrating an example of functional configurations of a meeting reservation system, the terminal device, the image display apparatus, and a guest terminal, according to an embodiment of the present disclosure;

FIG. 5 is a diagram illustrating an example of a reservation screen, which is displayed on a PC operated by a person who makes a reservation, according to an embodiment of the present disclosure;

FIG. 6 is a conceptual diagram illustrating an example of reservation information, according to an embodiment of the present disclosure;

FIG. 11 is a schematic diagram illustrating an example of a communication system, according to a variation of the present disclosure.

Figure 1:
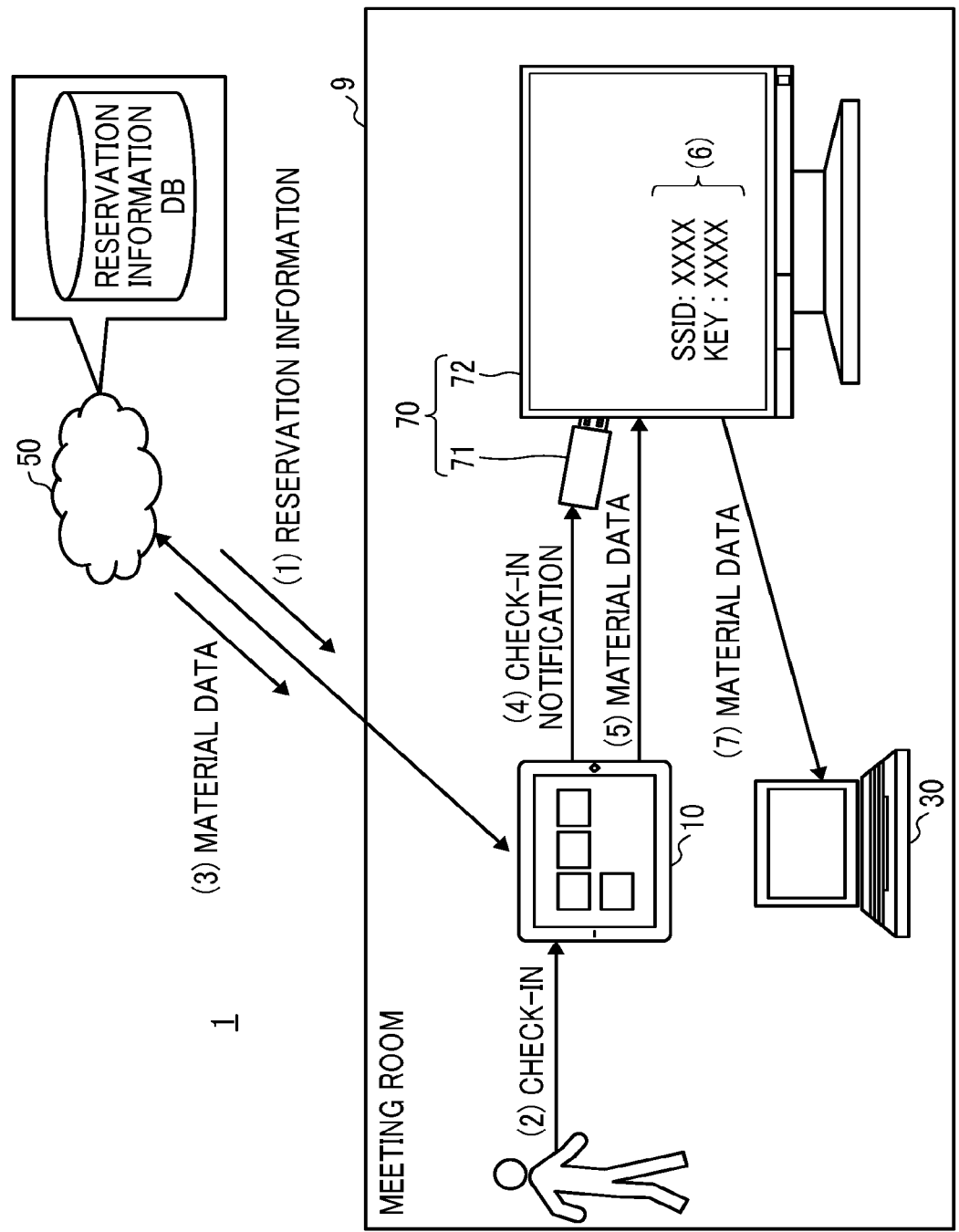
FIG. 1 is an illustration for describing an overview of how a terminal device causes an image display apparatus to display material data, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description will be given below of a communication system 1 and a communication method of a communication system 1 according to an embodiment of the present disclosure.

Overview of Operation of Communication System

In the communication system 1 according to the present embodiment, a terminal device 10 and an image display apparatus 70, which are located in a meeting room 9, set up a local network for each meeting. When a participant checks in the meeting room 9, material data corresponding to the meeting is transmitted from a meeting reservation system 50 to the terminal device 10. Then, the terminal device 10 transmits the material data to the image display apparatus 70. The image display apparatus 70 displays the material data, and thus the meeting participants can share the material data for the meeting.

A description will be given of an overview of operation of the communication system 1 according to the present embodiment with reference to FIG. 1. FIG. 1 is an illustration for describing an overview of how the terminal device 10 causes the image display apparatus 70 to display the material data.

(1) The terminal device 10 acquires reservation information of a meeting room of the current day, for example, from the meeting reservation system 50 in advance.

(2) A participant goes to the meeting room 9 and performs a check-in operation.

(3) When the check-in is successful, the terminal device 10 acquires material data to be used in the meeting from the meeting reservation system 50.

(4) In addition, when the check-in is successful, the terminal device 10 transmits check-in notification to the image display apparatus 70 via short-range wireless communication.

(5) As a result, the image display apparatus 70 is caused to operate as an access point. The image display apparatus 70 transmits connection information to the terminal device 10, and the terminal device 10 uses the connection information to connect to the image display apparatus 70. As a result, the material data can be transmitted via the local network that is set up temporarily. Because the image display apparatus 70 displays the material data, the participant is only required to perform check-in operation to share the material data. The local network is set up per meeting. Thus, it can be difficult for a third party who is not the meeting participant to acquire the material data from the image display apparatus 70.

(6) The image display apparatus 70 displays the connection information (for example, a service set identifier (SSID) and an encryption key), which is used to connect to the access point, on a display 72.

(7) Meanwhile, the participant brings a guest terminal 30 into the meeting room 9. Thus, when the connection information displayed by the image display apparatus 70 is set in the guest terminal 30, the guest terminal 30 can acquire and display the material data. As a result, the material data can also be shared on the guest terminal 30.

As described above, in the communication system 1 according to the present embodiment, the local network is set up each time a meeting is held. Thus, in a state where security is improved, the material data can be shared. In addition, the material data can be shared on the guest terminal 30 used by the participant. Furthermore, the material data displayed by the image display apparatus 70 that is located in the reserved meeting room without complicated operation.

Terms Used in the Present Disclosure

The term "start of use of a facility" refers to that a person who is allowed to use the facility by having made a reservation starts using the facility. In the present embodiment, the term "check-in" is used as an example to describe the start of the use of the facility. The term "check-in request" is used as an example to describe a use start request.

The term "schedule of the use of the facility" refers to information on when and how the facility is used. In the present embodiment, the term "reservation information" is used as an example to describe the schedule of the use of the facility. The term "facility" refers to a building service provided for a certain purpose. Examples of the facility include a meeting room, a booth, a classroom, and a section.

The term "information" refers to a material as a source of communication such as a meeting. For example, the information is data that serves as bases of a discussion and a determination. In the present embodiment, the information can be data that is displayed on the display. The term "material data" is used as an example to describe such information. The information may also be referred to as "shared data".

A first communication path can be any suitable communication path, provided that start notification can be transmitted through such a communication path. The first communication path can be connected all the time, or can be set up at the time of transmitting the use start notification. In the present embodiment, the term "short-range wireless communication path" is used as an example to describe the first communication path. A second communication path is a communication path through which a particular device can communicate using communication information in a period from the use start notification to use termination notification. In the present embodiment, the term "local network" is used as an example to describe the second communication path.

The meeting in the present embodiment is an example of communication and refers to communicating any idea by using senses of sight and hearing including a language, characters, voice, and an image. The meeting can also be referred to as conversation, a presentation, a lecture, a gathering, or the like.

Although an SSID and an encryption key are described as the connection information, any other suitable information can be required as the connection depending on the access point. For example, in a case where Bluetooth (registered trademark) is used, a pairing code is used as the connection information. In addition, some types of electronic whiteboard require a code such as a digit sequence as the connection information.

The term "access point" refers to a communication device by which the terminal device is connected to a wireless network, or refers to a relay point through which the terminal device is connected to a host computer. In a case where a device not dedicated to an access point, such as the image display apparatus 70, is caused to operate as the access point, such a device can be referred to as a "software access point".

System Configuration Example

Figure 2:
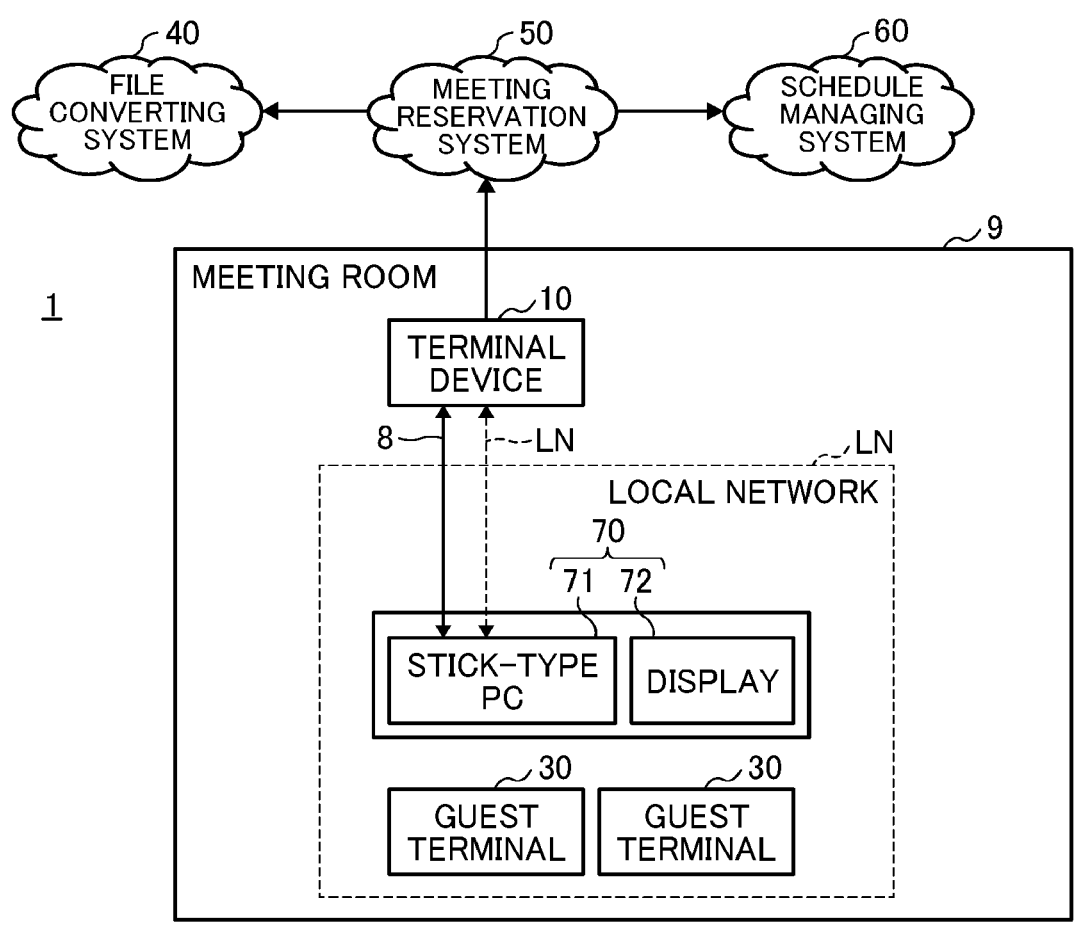
FIG. 2 is a schematic diagram illustrating an example of a configuration of a communication system, according to an embodiment of the present disclosure.

FIG. 2 is a schematic diagram illustrating an example of a configuration of the communication system 1. The communication system 1 includes a file converting system 40, the meeting reservation system 50, and a schedule managing system 60, the terminal device 10, and the image display apparatus 70. The terminal device 10 and the image display apparatus 70 are located in the meeting room 9. The file converting system 40, the meeting reservation system 50, and the schedule managing system 60 can communicate with each other via a network such as the Internet. The meeting reservation system 50 and the terminal device 10 can communicate with each other through the Internet and an intra-company network such as a local area network (LAN), which is constructed in the meeting room 9.

On the other hand, the terminal device 10 and the image display apparatus 70 communicate with each other via a short-range wireless communication path 8 instead of interposing the intra-company network. The short-range wireless communication refers to a communication system at a shorter distance than a wireless LAN or a mobile phone. Examples of the short-range wireless communication are Bluetooth (registered trademark), ZigBee (registered trademark), and infrared communication.

When a meeting is held, the image display apparatus 70 serves as an access point, and thereby a local network LN is set up. Via the local network LN, the terminal device 10 and the image display apparatus 70 communicate with each other during the meeting. Because the connection information is used for the local network, the third party who does not participate in the meeting is not allowed to connect to the local network. This reduces a chance of possible leakage of information such as the material data.

The image display apparatus 70 is an information processing apparatus including a stick-type personal computer (PC) 71 and the display 72. The stick-type PC 71 is a compact PC having a terminal such as of Universal Serial Bus (USB) or High-Definition Multimedia Interface (HDMI) connected to a terminal of the display 72 without a cable. Thus, the image display apparatus 70 can have the same or substantially the same configuration as a general-purpose PC.

The size of the image display apparatus 70 having such a configuration can be reduced. For example, there is a case where a device that falls within a category of the electronic whiteboard is set up in the meeting room 9. In such a case, a size of the electronic whiteboard is possibly too large for the meeting room 9. By contrast, with the configuration as illustrated in FIG. 2, the stick-type PC 71 provides a function of the information processing apparatus while the display 72 has a display function. As a result, the image display apparatus 70 can be downsized. The display 72 preferably includes a touchscreen, but the size does not change regardless of whether the display includes the touch screen.

In a case where a desktop PC and the display 72 are configured as the image display apparatus 70, a cable is required to connect the desktop PC and the display 72 even when the size of the desktop PC is small. Further, in a case where a laptop PC is used for the image display apparatus 70, a screen size is too small.

Thus, with the configuration in which the stick-type PC 71 and the display 72 are configured as the image display apparatus 70, a space of the meeting room 9 is not occupied by the image display apparatus 70, and the participants can share the material data on a large screen.

However, the above configuration is just an example. In another example, the image display apparatus 70 can be the electronic whiteboard, a combination of the desktop PC and the display 72, or the laptop PC. In addition, the display 72 can be a liquid crystal monitor, an organic electroluminescence (EL) display, a projector, or a rear projector.

The image display apparatus 70 may have a function of a whiteboard when communicating with a server that provides a function of an electronic whiteboard to a client. In such a case, the image display apparatus 70 acquires a web page in Hypertext Markup Language (HTML), a scripting language, or the like, and displays the web page by using browser software. In this way, the image display apparatus 70 is operated as a whiteboard (an electronic whiteboard) that accepts handwriting of a user and displays strokes. Similarly, the terminal device 10 can also function as the whiteboard. In addition to a type of the whiteboard that captures handwritten strokes on a touchscreen, the whiteboard may be implemented by a projector and a whiteboard (a normal whiteboard type not having a display).

The image display apparatus 70 sets up the local network LN, the connection information of which differs from meeting to meeting. Because the connection information differs from meeting to meeting, the material data displayed by the image display apparatus 70 is unlikely to be leaked. Meanwhile, because the image display apparatus 70 displays the connection information on the display 72, the guest terminal 30 brought by the participant can also be connected to the local network LN.

The terminal device 10 of the present embodiment is an information processing apparatus providing a function relating to use of the meeting room 9. At each meeting room, the terminal device 10 serves as a user interface between the participants and the meeting reservation system 50. For example, the terminal device 10 transmits identification information of the meeting room 9 managed by the terminal device 10, to acquire reservation information indicating reservation of the meeting room 9 from the meeting reservation system 50 and display at least one of the most recent meeting and a reservation status of the meeting room 9 of the current day. The terminal device 10 displays information transmitted from a web server by application software or the browser software on a display device.

The terminal device 10 has a function of accepting the check-in operation at the meeting room 9 by the participant and allowing the participant to check in the meeting room 9. When the participant performs the check-in operation, the terminal device 10 notifies the meeting reservation system 50 of a check-in request. The meeting reservation system 50 authenticates the check-in request (for which a code number described below is used). Then, when the authentication is established, the check-in is permitted.

The terminal device 10 is a general-purpose information processing apparatus. Examples of the terminal device 10 include a smartphone, a tablet device, and the laptop PC. The terminal device 10 can be any suitable information processing apparatus having a communication function, a display function, and an input function. Alternatively, the terminal device 10 can be at least one of an electronic whiteboard, a video meeting terminal, and a projector.

The guest terminal 30 is an information processing apparatus that is brought into the meeting room 9 by a user of the communication system 1. In another example, the guest terminal 30 is not brought into the meeting room 9. A user of the guest terminal 30 is a participant in most cases. The participant can be classified to a meeting organizer and a usual participant, who is a participant other than the meeting organizer. The meeting organizer is a person who makes a reservation for the meeting. The meeting organizer and the usual participant do not have to be strictly distinguished from each other. The guest terminal 30 used by the meeting organizer can be referred to as an "organizer's terminal", and the guest terminal 30 used by the usual participant can be referred to as a "participant's terminal".

The guest terminal 30 is the general-purpose information processing apparatus. Examples of the guest terminal 30 include a smartphone, a tablet device, and a laptop PC. In the present embodiment, the guest terminal 30 can be an information processing apparatus on which a browser operates.

The schedule managing system 60, which is implemented by one or more information processing apparatuses, manages a schedule of any user on a cloud system, for example. The schedule management performed by the schedule managing system include the management of reservation of the meeting room 9. When making the reservation of the meeting room 9, the participant can register the material data, which the participant wants to share at the meeting, in reservation information of the meeting room 9. As examples of the schedule managing system 60, Google Calendar (registered trademark), Office 365 (registered trademark), and the like are known. As long as a technical specification is satisfied, any system can be adopted as the schedule managing system 60.

The meeting reservation system 50, which is implemented by one or more information processing apparatuses, manages the use of the meeting room 9 and reservation information. The meeting reservation system 50 initially acquires reservation information of the meeting room 9, which is stored in the schedule managing system 60, from the schedule managing system 60. In another example, the meeting reservation system 50 can also include the functions of the schedule managing system 60. In this case, the schedule managing system 60 can be omitted. One of the reasons why the schedule managing system 60, which is an external resource, is used in the present embodiment is that development cost can be reduced by using the schedule managing system 60 as an external resource.

The meeting reservation system 50 communicates with one or more of the terminal devices 10 located at each of the meeting rooms 9, and transmits the reservation information of the current day to the terminal devices 10, for example. The meeting reservation system 50 periodically updates the reservation information, and manages a status indicating a status of the meeting per meeting. For example, the meeting reservation system 50 manages the status from the check-in to check-out.

The file converting system 40 is an information processing apparatus that converts a format of the material data to a format that can be displayed by the image display apparatus 70. For example, the file converting system 40 converts a file of a particular application to general image data. However, in a case where the format of the material data is the format that can be displayed by the image display apparatus 70, the file converting system 40 can be omitted.

The file converting system 40, the meeting reservation system 50, and the schedule managing system 60 can be implemented by cloud computing. The file converting system 40, the meeting reservation system 50, and the schedule managing system 60 can be built in a data center or the like in fact.

The configuration illustrated in FIG. 2 is merely an example. In another example, all of the file converting system 40, the meeting reservation system 50, and the schedule managing system 60 can be provided in the intra-company network. In still another example, at least one of the file converting system 40, the meeting reservation system 50, and the schedule managing system 60 can be provided in the intra-company network.

Example of Hardware Configuration

Next, a description will be given of hardware configurations of the file converting system 40, the meeting reservation system 50, the schedule managing system 60, the guest terminal 30, and the terminal device 10 in the communication system 1 according to the present embodiment.

Example of Hardware Configurations of File Converting System 40, Meeting Reservation System 50, Schedule Managing System 60, Guest Terminal 30, and Terminal Device 10

Figure 3:
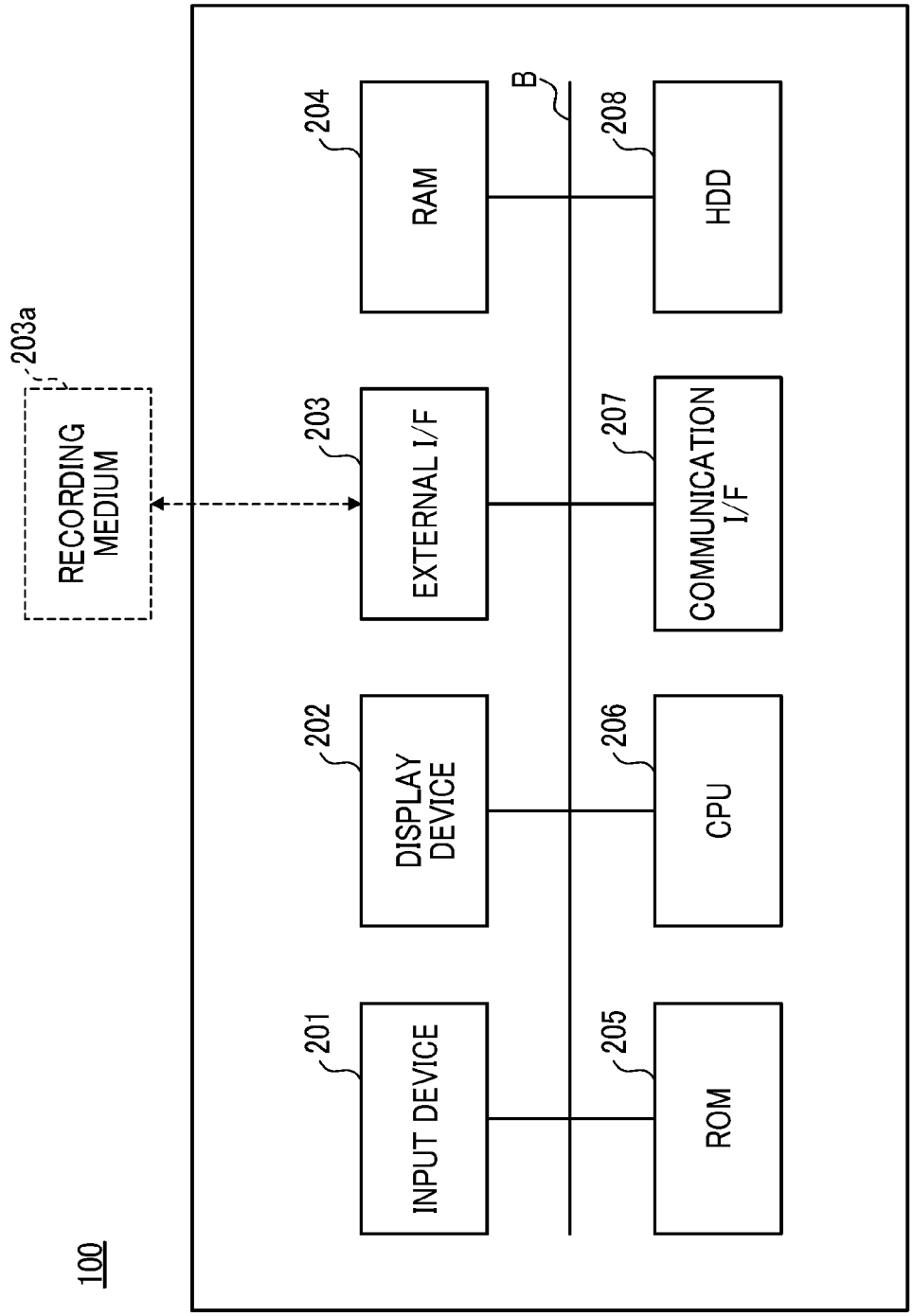
FIG. 3 is a block diagram illustrating an example of a hardware configuration of a computer system, according to an embodiment of the present disclosure.

Each of the file converting system 40, the meeting reservation system 50, the schedule managing system 60, the guest terminal 30, and the terminal device 10 is implemented by a computer system having a hardware configuration illustrated in FIG. 3, for example. FIG. 3 is a block diagram illustrating an example of a hardware configuration a computer system 100 according to the present embodiment.

The computer system 100 illustrated in FIG. 3 includes an input device 201, a display device 202, an external interface (I/F) 203, random access memory (RAM) 204, read only memory (ROM) 205, a central processing unit (CPU) 206, a communication I/F 207, a hard disk drive (HDD) 208, and the like, and such components are mutually connected by a bus B.

The input device 201 includes a keyboard, a mouse, a touchscreen, or the like, and is used when the user inputs each operation signal. The display device 202 may be a liquid crystal display, an organic EL display, or the like, and displays a processing result by the computer system 100.

The communication I/F 207 is an interface used to connect the computer system 100 to the intra-company network, the Internet, and the like. In this way, the computer system 100 can make data communication via the communication I/F 207.

The HDD 208 is a non-volatile storage device that stores programs and data. Examples of the stored programs and the stored data are an Operating System (OS) as basic software that controls entire operation of the computer system 100, and application software that provides various functions on the OS. The HDD 208 manages the stored programs and the stored data by at least one of a predetermined file system and a database (DB).

The external I/F 203 is an interface with an external device. An example of the external device is a recording medium 203a. Thus, the computer system 100 can perform at least one of reading and writing of the recording medium 203a via the external I/F 203. Examples of the recording medium 203a are a flexible disk, a Compact Disk (CD), a Digital Versatile Disk (DVD), a Secure Digital (SD) memory card, and a USB memory stick.

The ROM 205 is non-volatile semiconductor memory (a storage device) that can hold programs and data even when power is turned off. The ROM 205 stores the programs and the data used for a Basic Input/Output System (BIOS), OS settings, network settings, and the like that are made when the computer system 100 is activated. The RAM 204 is volatile semiconductor memory (a storage device) that temporarily holds programs and data.

The CPU 206 is an arithmetic device that loads the programs and the data from the storage devices such as the ROM 205 and the HDD 208 onto the RAM 204 and executes processing to implement overall control of the computer system 100 or functions of the computer system 100.

The file converting system 40, the meeting reservation system 50, and the schedule managing system 60 are preferably compatible with the cloud computing. The term "cloud computing" refers to computing where resources on a network are used or accessed without identifying specific hardware resources.

Functions

Next, a description will be given of functions of the meeting reservation system 50, the terminal device 10, the image display apparatus 70, and the guest terminal 30 with reference to FIG. 4. FIG. 4 is a block diagram illustrating an example of functional configurations of the meeting reservation system 50, the terminal device 10, the image display apparatus 70, and the guest terminal 30.

Functions of Meeting Reservation System 50

The meeting reservation system 50 includes a second communicating unit 51, a material data managing unit 52, a reservation managing unit 53, and a reservation information acquiring unit 54. These functions of the meeting reservation system 50 are functions that are implemented by operating one or more hardware elements illustrated in FIG. 3 in cooperation with instructions of the CPU 206 according to the program expanded from the HDD 208 to the RAM 204. Such a program is distributed from a server for program distribution, or is distributed in a state of being stored in a storage medium. The meeting reservation system 50 also includes a reservation information DB 55 held in the HDD 208, the RAM 204, or the like.

The second communicating unit 51 exchanges various types of the information with the file converting system 40, the terminal device 10, and the schedule managing system 60 via the network. In the present embodiment, the second communicating unit 51 at least transmits the reservation information of the day to the terminal device 10, and receives the check-in request from the terminal device 10. In addition, the second communicating unit 51 transmits the material data (before conversion) to the file converting system 40, and receives the material data (after conversion) from the file converting system 40. Furthermore, the second communicating unit 51 receives the reservation information from the schedule managing system 60.

The reservation information acquiring unit 54 acquires the reservation information from the schedule managing system 60 via the second communicating unit 51. Because the reservation information of each company is registered in the schedule managing system 60, the reservation information acquiring unit 54 specifies an account (a user name and a password) in the schedule managing system 60, which is registered in advance per company, for login, and acquires the reservation information that is registered in association with the account having a domain included in such an account. For example, in the case where the user name of the account in the schedule managing system 60, which is registered in advance per company, is "a@xfood.com", the reservation information acquiring unit 54 acquires the reservation information registered for the account of "xxx@xfood.com" (xxx is arbitrary).

The reservation information acquiring unit 54 is notified at timing at which the new reservation information is registered in the schedule managing system 60, and then accesses the schedule managing system 60 to acquire the reservation information. Alternatively, the reservation information acquiring unit 54 may periodically (for example, once per hour or the like) access the schedule managing system 60 to acquire the reservation information.

The reservation information acquired by the reservation information acquiring unit 54 is stored in the reservation information DB 55. The reservation information will be described later with reference to FIG. 6.

The reservation managing unit 53 acquires the notification such as the check-in from the terminal device 10, and authenticates the participant with the code number, which will be described below, or the like. In this way, the reservation managing unit 53 determines whether the participant can check in (whether the start of the use of the meeting room can be permitted). In the case where the reservation managing unit 53 determines that the participant can check in, the reservation managing unit 53 updates the status of the reservation information in the reservation information DB 55 to checked-in. Examples of the status are check-in unpermitted, check-in permitted, and checked-in.

The reservation managing unit 53 also accepts the check-out. Because the code number is not transmitted at the check-out. Thus, the reservation managing unit 53 accepts the check-out when receiving a check-out request (the use termination notification of the meeting room).

In the case where the meeting room 9 is reserved, the reservation managing unit 53 transmits the code number for the check-in to the participant and the like by using a chat system, an e-mail, or the like. In response to a request from the terminal device 10, the reservation managing unit 53 acquires the reservation information of the day from the reservation information DB 55, and transmits the reservation information of the day to the terminal device 10 via the second communicating unit 51. The material data is possibly attached to such reservation information.

The material data managing unit 52 transmits the material data to the file converting system 40 a predetermined time before meeting start time, and acquires the converted material data. The converted material data is managed in association with the reservation information.

Functions of Terminal Device 10

The terminal device 10 includes a first communicating unit 11, a check-in accepting unit 12, a material data acquiring unit 13, a material data transmitting unit 14, a reservation information receiving unit 15, a reservation information display unit 16, and a first short-range communicating unit 17. These functions of the terminal device 10 are functions that are implemented by operating one or more hardware elements illustrated in FIG. 3 in cooperation with instructions of the CPU 206 according to the program expanded from the HDD 208 to the RAM 204. Such a program is distributed from the server for program distribution, or is distributed in the state of being stored in the storage medium.

The first communicating unit 11 exchanges various types of the data with the meeting reservation system 50 via the network. In the present embodiment, the first communicating unit 11 acquires the reservation information of the day for example from the meeting reservation system 50 by specifying the identification information (for example, a name, an ID, and the like of the meeting room) of the meeting room 9, and transmits the check-in request in response to an operation by the participant.

The reservation information receiving unit 15 communicates with the meeting reservation system 50 via the first communicating unit 11 to transmit the identification information of the meeting room 9 in which the terminal device 10 is provided, and thereby acquires the reservation information of the meeting room 9 in which the terminal device 10 is provided. The reservation information receiving unit 15 periodically acquires the reservation information of the meeting room 9 once per minute, for example. In another example, the reservation information receiving unit 15 acquires the reservation information of the meeting room 9 in response to an operation by the participant. In still another example, the reservation information receiving unit 15 acquires the reservation information of the meeting room 9 when the terminal device 10 is activated. The reservation information receiving unit 15 preferably acquires the reservation information at least once a day.

The acquired reservation information preferably includes at least the reservation information of the day. In another example, the reservation information receiving unit 15 can acquire the reservation information by the day before. The reservation information of a whole day is not necessarily to be acquired at once. For example, the reservation information can be acquired one by one at different timing. Examples of such timing include one hour before and 30 minutes before each of the meetings.

The reservation information receiving unit 15 can acquire the reservation information by a pull method, or can acquire the reservation information by a push method. Furthermore, the reservation information receiving unit 15 can acquire the reservation information by the pull method when receiving a notification that the reservation information of the day acquired from the meeting reservation system 50 is updated, for example.

The reservation information display unit 16 displays the acquired reservation information on a screen (the display device) of the terminal device 10. The reservation information display unit 16 constantly display information on the next reservation from current time. The reservation information display unit 16 may further display a list of the reservation information of the day. However, in a case where no operation is performed for a certain period, the list of the reservation information can become invisible in conjunction with turning off the power of only the display device of the terminal device 10 for a purpose of energy saving. Even in this case, the terminal device 10 is in an activated state. For example, the terminal device 10 displays the reservation information in response to the operation by the participant. In another example, the terminal device displays the reservation information in conjunction with entry of the participant into the meeting room 9.

The check-in accepting unit 12 accepts input of the code number, of which the participant is notified in advance, or captures a barcode (or a two-dimensional code) including the above code number, of which the participant is notified in advance, so as to accept the input of the code number. The check-in accepting unit 12 transmits the code number and the check-in request to the meeting reservation system 50 so as to acquire success or failure of the check-in. The terminal device 10 may acquire the code number together with the reservation information and authenticate the code number on the terminal side.

When the check-in is successful, the material data acquiring unit 13 requests the meeting reservation system 50 for the material data by specifying the identification information of the meeting room 9 and a time period, to acquire the material data. The material data acquiring unit 13 may acquire the material data by using information that can specify or identify the reservation information as a key. An example of such information is an event ID included in the reservation information. In a case where the material data acquiring unit 13 acquires the material data after the check-in, it is possible to reduce such a chance that the third party views the material data.

The first short-range communicating unit 17 communicates with the image display apparatus 70 by the short-range wireless communication. Although the terminal device 10 and the image display apparatus 70 are preferably paired in advance for such short-range wireless communication in terms of security, a peripheral device may be searched at the time of executing the short-range wireless communication. The first short-range communicating unit 17 transmits the check-in notification and check-out notification to the image display apparatus 70. By the check-in notification, the first short-range communicating unit 17 requests the image display apparatus 70 to start the local network LN. Here, the first short-range communicating unit 17 receives the connection information used to connect to the local network LN. By the check-out notification, the first short-range communicating unit 17 requests the image display apparatus 70 to terminate the local network LN and delete the material data.

The material data transmitting unit 14 is connected to the image display apparatus 70 by using the connection information, and transmits the material data received by the material data acquiring unit 13 to the image display apparatus 70. In order to connect to the local network LN of the image display apparatus 70, the material data transmitting unit 14 communicates by the wireless LAN, Wi-Fi, or the like. An Internet Protocol (IP) address of the image display apparatus 70 may be set in advance in the terminal device 10, or may be transmitted with the connection information.

Functions of Image Display Apparatus 70

The image display apparatus 70 includes an access-point functioning unit 73, a second short-range communicating unit 74, a server unit 75, a material data receiving unit 76, and a display processing unit 77. These functions of the image display apparatus 70 are functions that are implemented by operating one or more hardware elements illustrated in FIG. 3 in cooperation with instructions of the CPU 206 according to the program expanded from the HDD 208 to the RAM 204. Such a program is distributed from the server for program distribution, or is distributed in the state of being stored in the storage medium.

The second short-range communicating unit 74 makes the short-range wireless communication with the terminal device 10. When receiving the check-in notification from the terminal device 10 as described above, the second short-range communicating unit 74 activates the access-point functioning unit 73.

The access-point functioning unit 73 generates the SSID and the encryption key (may also referred to as the password, simply a key, or the like) per meeting (per check-in), and is operated as the access point. In this way, the local network LN is set up. The access-point functioning unit 73 periodically transmits a packet referred to as a beacon. The beacon includes the SSID, channel (frequency) information, a list of supported transfer rates, and the like. When the terminal device 10 starts the connection, the access-point functioning unit 73 performs an authentication process and exchanges a secret key after an association process. From then on, the access-point functioning unit 73 communicates with the terminal device 10 while exchanging the secret key periodically.

The material data receiving unit 76 receives the material data from the terminal device 10, and provides the material data to the display processing unit 77 and the server unit 75.

The display processing unit 77 displays the material data on the display device. The display processing unit 77 also acquires the connection information from the access-point functioning unit 73 and displays the connection information on the display device. In this way, the guest terminal 30 can be connected to the image display apparatus 70. The connection information may be displayed in a text format or in a two-dimensional code. Furthermore, the display processing unit 77 acquires a Uniform Resource Locator (URL) indicating an acquisition destination of the material data from the server unit 75 and displays the URL. The connection information and the URL may be transmitted to the terminal device 10, and the terminal device 10 may display the connection information and the URL.

The server unit 75 has a server function to transmit the material data as a file to the guest terminal 30. The server unit 75 generates the URL indicating the acquisition destination of the material data. In the case where the server unit 75 merely transmit the file, the server unit 75 may be a File Transfer Protocol (FTP) server. Meanwhile, in the case where the server unit 75 supports page feed or the like of the file, the server unit 75 preferably provides a Web application including the material data and a menu button such as of the page feed. Thus, the server unit 75 preferably has a function as a Web server (an HTTP server). The server unit 75 analyzes an FTP command or an HTTP method and transfers the file or executes a Common Gateway Interface (CGI) program or the like, so as to return the file or a processing result. For example, when receiving a request for the material data to the URL indicating the acquisition destination of the material data by the FTP command or the HTTP method, the server unit 75 transmits the material data to the guest terminal 30 in accordance with a communication procedure. Instead of the URL, a pair of the IP address of the image display apparatus 70 and a file name or a pair of a computer name and the file name may be used.

Functions of Guest Terminal 30

The guest terminal 30 includes a display control unit 31, an operation accepting unit 32, and a third communicating unit 33. These functions of the guest terminal 30 are functions that are implemented by operating one or more hardware elements illustrated in FIG. 3 in cooperation with instructions of the CPU 206 according to the program expanded from the HDD 208 to the RAM 204. Such a program is distributed from the server for program distribution, or is distributed in the state of being stored in the storage medium.

The third communicating unit 33 is connected to the image display apparatus 70 by using the connection information set by the participant, sets the URL set by the participant as a communication destination, and receives the material data. The display control unit 31 displays the material data on a display device of the guest terminal 30. In the case where the server unit 75 of the image display apparatus 70 is the Web server, screen information in which the material data is written in HTML, a scripting language, and Cascade Style Sheet (CSS) is transmitted. Thus, the display control unit 31 analyzes the screen information and then displays the material data. The operation accepting unit 32 accepts various operations on the guest terminal 30. For example, the operation accepting unit 32 accepts setting of the connection information and setting of the URL indicating the acquisition destination of the material data.

Reservation Screen

Next, a description will be given of a reservation screen on which a person who makes a reservation reserves the meeting room 9 with reference to FIG. 5. FIG. 5 illustrates an example of a reservation screen 501 that is displayed on a PC operated by the person who makes the reservation. It is assumed that the person who makes the reservation (the meeting organizer) is one of the meeting participants. However, anyone can make the reservation. The person who makes the reservation makes the PC communicate with the schedule managing system 60, and logs in with the account for the company, to which the person who makes the reservation belongs and which is issued by the schedule managing system 60. Thus, the participants in the same company are identified by the domain included in the account.

The reservation screen 501 includes a title field 502, a meeting room field 503, a material data field 504, a meeting start date and time field 505, a meeting end date and time field 506, a note field 507, a participant field 508, and the like.

The title field 502 is a field in which titles of a meeting agenda are input.

The meeting room field 503 is a field in which the meeting room 9 to be reserved by the participant is set. The meeting room 9 that can be selected in the company is registered in advance in the schedule managing system 60, and the person who makes the reservation can select the meeting room 9 from a pop-up menu, a pull-down menu, or the like.

In the material data field 504, the file name of the material data that the person who makes the reservation attaches to the reservation information is displayed. Just as described, the material data is managed in association with the reservation information.

The meeting start date and time field 505 is a field in which a data when the meeting is held and time at which the meeting is started are set. The date and the time can be selected from a pull-down menu or the like.

The meeting end date and time field 506 is a field in which the date when the meeting is held and time at which the meeting is finished are set. The date and the time can be selected from a pull-down menu or the like.

The note field 507 is a field in which any information on the meeting is set.

The participant field 508 is a field which is used to set the participants and in which the set participants are displayed. In FIG. 5, three employees are registered as the participants. However, the meeting room 9 and a remote meeting device (the videoconference terminal) can also be registered as the participants. In the present embodiment, the participants who can be selected in the company are registered in advance in the schedule managing system 60, and the person who makes the reservation can select the participant from a pop-up menu, a pull-down menu, or the like.

Example of Reservation Information

The reservation information, which is set on the reservation screen 501 as illustrated in FIG. 5, is transmitted to the schedule managing system 60 and registered in the schedule managing system 60. Then, the meeting reservation system 50 appropriately acquires the reservation information from the schedule managing system 60, and manages the reservation information in the reservation information DB 55.

A description will be given of the reservation information with reference to FIG. 6. FIG. 6 illustrates an example of the reservation information. The reservation information has items of a meeting room ID, the event ID, the person who makes the reservation, a reminder notification destination, the meeting start time, meeting end time, the title, attachment file information, the meeting status, a time until automatic cancellation, and the code number. The meeting room ID is identification information used to specify or identify the meeting room 9. ID is abbreviation of Identification and means an identifier and the identification information. ID is any one of a name, a symbol, a character string, a numerical value, or a combination of at least two of these items, which is used to uniquely identifying a specific object from among a plurality of objects.

The event ID is identification information used to identify each of the reservation information. The event ID is assigned by the schedule managing system 60. In the item of the person who makes the reservation, a mail address of the person who makes the reservation is set. As the reminder notification destination, a destination to which the meeting reservation system 50 transmits a reminder of the reservation of the meeting room 9 is set. In the example illustrated in FIG. 6, a group of the chat system is specified. In another example, the reminder notification destination can be an e-mail address. The meeting start time, the meeting end time, and the title have been described with reference to FIG. 5.

As the attachment file information, a URL of a storage location of the material data is indicated. The attachment file information may be indicated by a file path or the like. When the check-in is successful, the terminal device 10 acquires the material data on the basis of the attachment file information. The meeting status indicates what kind of the status the meeting is in, and means the above status. The time until the automatic cancellation is a time until the reservation of the meeting room 9 is canceled. In a case where the participant does not check in even after a lapse of a predetermined time from the meeting start time, the reservation managing unit 53 cancels the reservation of the meeting room 9. The code number is authentication information that the participant inputs in the terminal device 10 at the time of the check-in.

Process of Acquiring Reservation Information by Terminal Device 10

Figure 7:
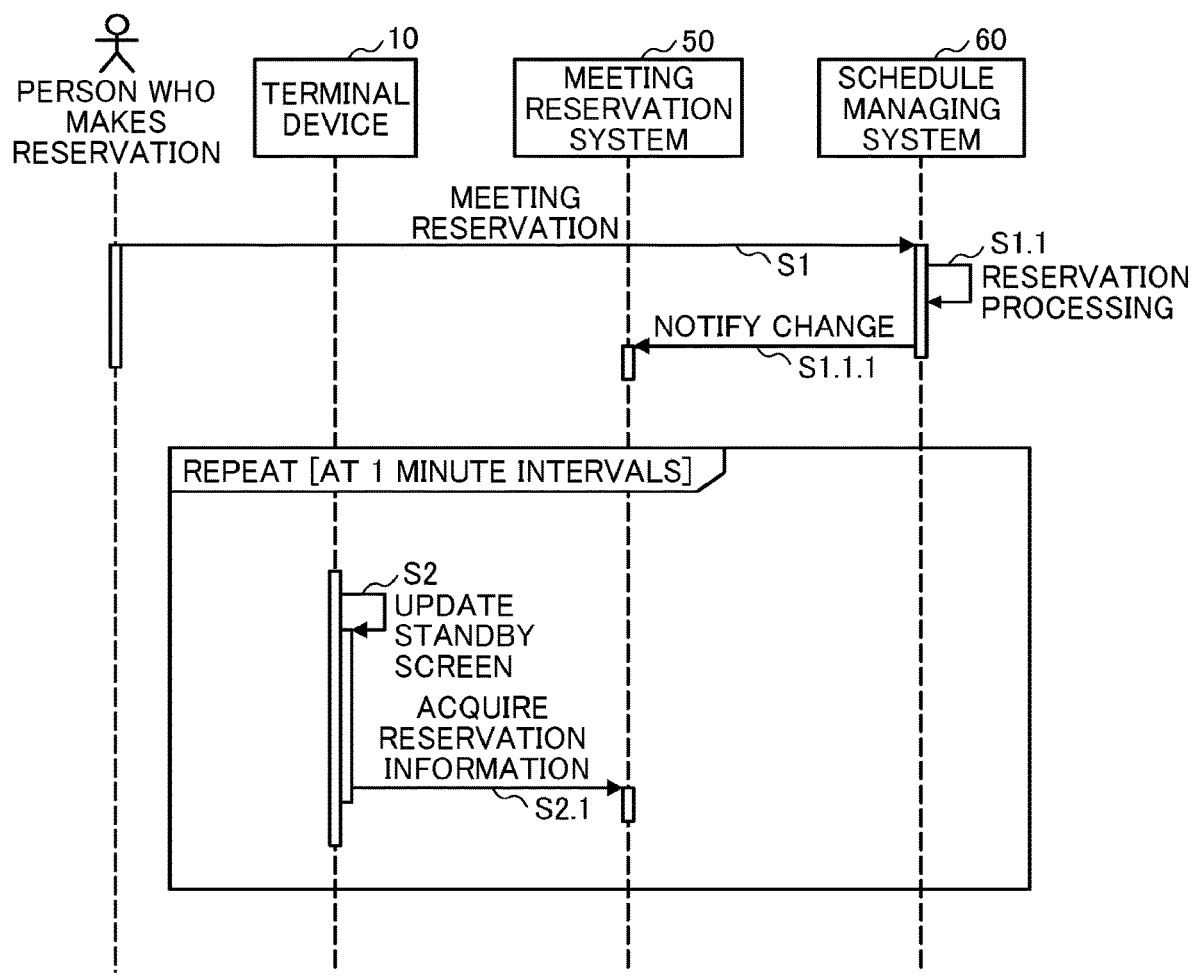
FIG. 7 is a sequence diagram illustrating an example of an operation in which a person who makes a reservation reserves a meeting room and the terminal device acquires the reservation information, according to an embodiment of the present disclosure.

FIG. 7 is an example of a sequence diagram illustrating a process in which the person who makes the reservation reserves the meeting room 9 and the terminal device 10 acquires the reservation information.

S1: The person who makes a reservation reserves the meeting room 9 on the reservation screen 501 illustrated in FIG. 5.

S1.1: The schedule managing system 60 accepts the reservation and generates the reservation information.

S1.1.1: The schedule managing system 60 notifies the meeting reservation system 50 of addition to or a change in the reservation information. Because the domain of a company that uses the meeting reservation system 50 is registered in the schedule managing system 60 as described above, the company (the meeting reservation system 50) is identified based on an account of the person who makes the reservation and registers the reservation information.

S2: The reservation information display unit 16 of the terminal device 10 repeatedly performs a processing of updating a standby screen 511 illustrated in FIG. 8.

S2.1: In this processing, the reservation information receiving unit 15 acquires the reservation information from the meeting reservation system 50 by specifying the meeting room ID. The update of the standby screen 511 is periodically repeated at one-minute intervals, for example. In another example, the update of the standby screen 511 can be repeated irregularly. Thus, the meeting room 9 is newly reserved. In a case where the newly-reserved meeting is the next meeting at the current time, the newly-reserved meeting is displayed on the standby screen 511. The status of the meeting is also updated accordingly.

Example of Terminal Device Screen

In response to acquiring reservation information, the terminal device 10 primarily displays the standby screen of the next reservation at the current time among the reservations of the day.

Figure 8:
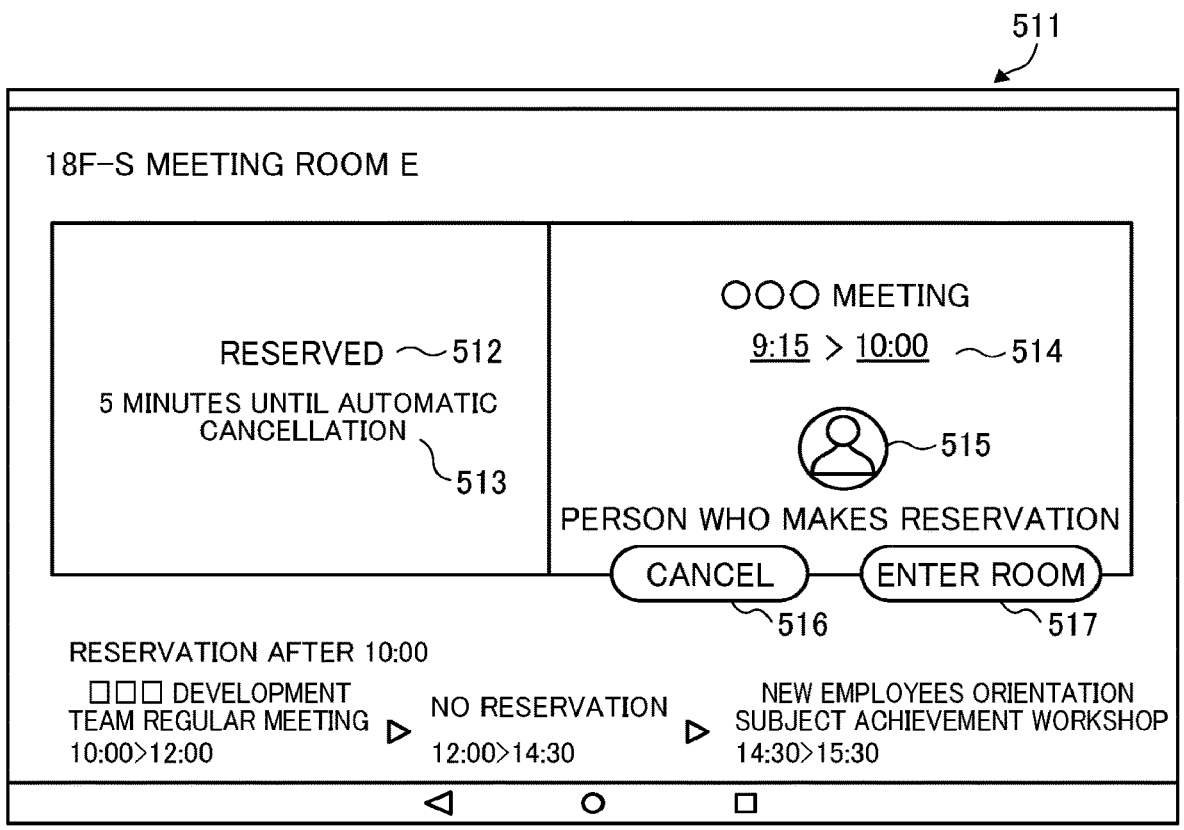
FIG. 8 is a diagram illustrating an example of a standby screen displayed by the terminal device, according to an embodiment of the present disclosure.

FIG. 8 illustrates an example of the standby screen 511 displayed by the terminal device 10. The standby screen 511 is a screen that is displayed by the terminal device 10 after a given meeting and before another meeting to be held next to the given meeting. In a left portion of the standby screen 511, a message 512 of "RESERVED" and a message 513 of "5 MINUTES UNTIL AUTOMATIC CANCELLATION" are displayed. By the message 512 of "RESERVED", a person who does not make a reservation understands that the use of the meeting room 9 is not allowed. By the message 513 of "5 MINUTES UNTIL AUTOMATIC CANCELLATION", it is understood that the participant has to check in within five minutes and that the meeting room 9 can be used five minutes later.

In a right portion of the standby screen 511, a time 514 of the next meeting from the current time is displayed. In addition, information on the person who makes the reservation 515 such as a photograph or an avatar (an icon) of the person who makes the reservation is displayed. Furthermore, a cancel button 516 and an enter room button 517 are displayed. The cancel button 516 is a button that is used when the participant cancels the reservation. The enter room button 517 is a button for checking in. When one of the cancel button 516 and the enter room button 517 is pressed, a code number input screen is displayed.

In a lower portion of the standby screen 511, information on reservations ahead of the next reservation is displayed. Thus, a person who wishes to use the meeting room 9 can check available time.

Process of Sharing Material Data

Figure 9:
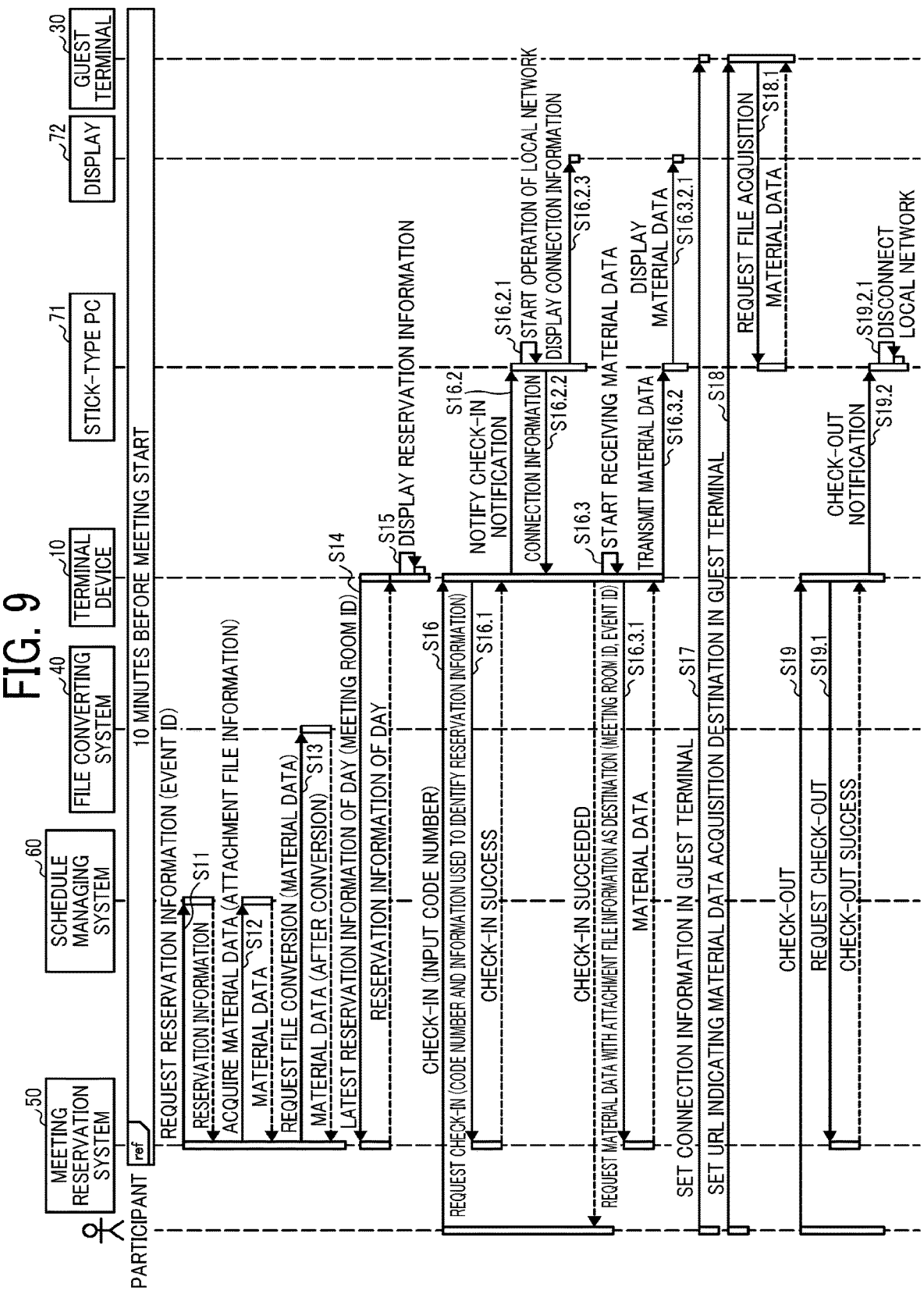
FIG. 9 is a sequence diagram illustrating an example of an operation, in which the communication system shares material data, according to an embodiment of the present disclosure.

Next, a description will be given a process of sharing the image display apparatus 70 with reference to FIG. 9. FIG. 9 is a sequence diagram illustrating an example of a process of sharing material data which the communication system 1.

S11: Immediately before a meeting start time of reservation information, the reservation information acquiring unit 54 of the meeting reservation system 50 acquires the reservation information from the schedule managing system 60 by using the event ID as the key, for example. Time immediately before the meeting start time is 10 minutes before the meeting start time, for example, but may be before or after such time. By acquiring the reservation information immediately before the meeting start time, the latest reservation information can be acquired.

S12: The reservation information acquiring unit 54 of the meeting reservation system 50 uses the attachment file information included in the reservation information to acquire the material data.

S13: When the material data managing unit 52 determines that the attachment file is a file to be converted such as a file generated by an application, the material data managing unit 52 requests the file converting system 40 to convert the file. Thus, the material data that is converted to the image data such as PNG or JPEG, or the like is acquired.

S14: As described with reference to FIG. 7, the reservation information receiving unit 15 of the terminal device 10 periodically acquires the latest reservation information of the day by specifying the meeting room ID.

S15: The reservation information display unit 16 displays the reservation information on the display device. The reservation information display unit 16 determines whether the participant can check in on the basis of the meeting status in the reservation information. If the participant can check in, the reservation information display unit 16 displays the standby screen 511 as illustrated in FIG. 8.

S16: Next, the participant comes to the meeting room 9 for the check-in, operates the terminal device 10, and inputs the code number into the terminal device 10 in the meeting room 9.

S16.1: The check-in accepting unit 12 of the terminal device 10 accepts the check-in, and transmits the check-in request, which includes the code number and the information used to identify the reservation information (for example, the event ID or a combination of the meeting room ID and the time), to the meeting reservation system 50 via the first communicating unit 11. The second communicating unit 51 of the meeting reservation system 50 acquires the check-in request, and the reservation managing unit 53 accepts the check-in. In the present embodiment, it is assumed that the authentication based on the code number is successful and the check-in is accepted. The reservation managing unit 53 changes the status of the reservation information of the meeting room 9, which is specified by the information used to identify the reservation information, to the checked-in. The reservation managing unit 53 of the meeting reservation system 50 transmits the check-in success to the terminal device 10 via the second communicating unit 51.

S16.2: The first communicating unit 11 of the terminal device 10 receives the success of the check-in, and thus the first short-range communicating unit 17 transmits the check-in notification to the image display apparatus 70.

S16.2.1: The second short-range communicating unit 74 of the image display apparatus 70 receives the check-in notification, and the access-point functioning unit 73 starts being operated as the access point of the local network LN. That is, the access-point functioning unit 73 generates the connection information (an SSID and an encryption key), and starts transmitting a beacon.

S16.2.2: The second short-range communicating unit 74 of the image display apparatus 70 transmits the connection information to the terminal device 10. This step is not necessarily to be executed. However, if the terminal device 10 communicates with the image display apparatus 70 using the connection information, a communication speed of the wireless LAN is faster than the communication speed of the short-range wireless communication. Thus, a transmission time of the material data can be shortened.

S16.2.3: The display processing unit 77 of the image display apparatus 70 displays the connection information on the display 72.

S16.3: The terminal device 10 receives the success of check-in, and thus the material data acquiring unit 13 starts receiving the material data. That is, the material data acquiring unit 13 acquires the attachment file information in the reservation information.

S16.3.1: The material data acquiring unit 13 of the terminal device 10 transmits, to the meeting reservation system 50, a request for the attachment file (the material data) together with the meeting room ID and the event ID via the first communicating unit 11. Thus, the material data acquiring unit 13 can receive the material data. The meeting room ID and the event ID are transmitted based on which the material data managing unit 52 of the meeting reservation system 50 determines whether to transmit the material data. For this reason, the meeting room ID and the event ID may not be transmitted.

As examples of a process of acquiring the material data, the following process can be used.

(i) In a case where the terminal device 10 can directly access a file saving destination indicated by the attachment file information included in the reservation information, the terminal device 10 directly accesses the file saving destination to acquire the attachment file. In this case, information on the file saving destination is required as the attachment file information when the reservation information is acquired in step S14 and at the time of the check-in request in step S16.1. In addition, in order to ensure the security, the meeting room ID and the event ID are transmitted to the meeting reservation system 50 based on which the meeting reservation system 50 determine whether to transmit the attachment file, for example. In other words, in this case, it is assumed that the file saving destination is located within the meeting reservation system 50.

(ii) The terminal device 10 simply transmits the attachment file request together with the meeting ID and the event ID to the meeting reservation system 50, and the meeting reservation system 50 identifies the attachment file information (the saving destination of the attachment file) on the basis of the meeting ID and the event ID. Then, the meeting reservation system 50 acquires the attachment file and transmits the attachment file to the terminal device 10. In this, the attachment file can be stored in any location accessible by the meeting reservation system 50. In other words, even in a case where the saving destination of the attachment file is an external server that requires authentication of each user of a cloud service or the like, as long as the meeting reservation system 50 holds information for the user authentication, the meeting reservation system 50 requests the external server for the attachment file by using the information for the user authentication and thus can acquire the attachment file. As a result, the meeting reservation system 50 does not have to transmit the user authentication information to each of the terminal devices 10.

S16.3.2: The material data transmitting unit 14 of the terminal device 10 uses the connection information to connect to the access point, and transmits the material data to the image display apparatus 70 by specifying an IP address of the image display apparatus 70 as a destination. The material data receiving unit 76 of the image display apparatus 70 receives the material data via the access-point functioning unit 73. The material data receiving unit 76 first sends the material data to the server unit 75, and the server unit 75 stores the material data in a folder or the like. In addition, the server unit 75 determines a URL that indicates the acquisition destination of the material data corresponding to this folder. The URL indicating the acquisition destination of the material data is sent to the display processing unit 77. The terminal device 10 can transmit the material data to the image display apparatus 70 by the short-range wireless communication. In this case, the second short-range communicating unit 74 of the image display apparatus 70 does not have to transmit the connection information to the terminal device 10 in step S16.2.2.

Figure 10:
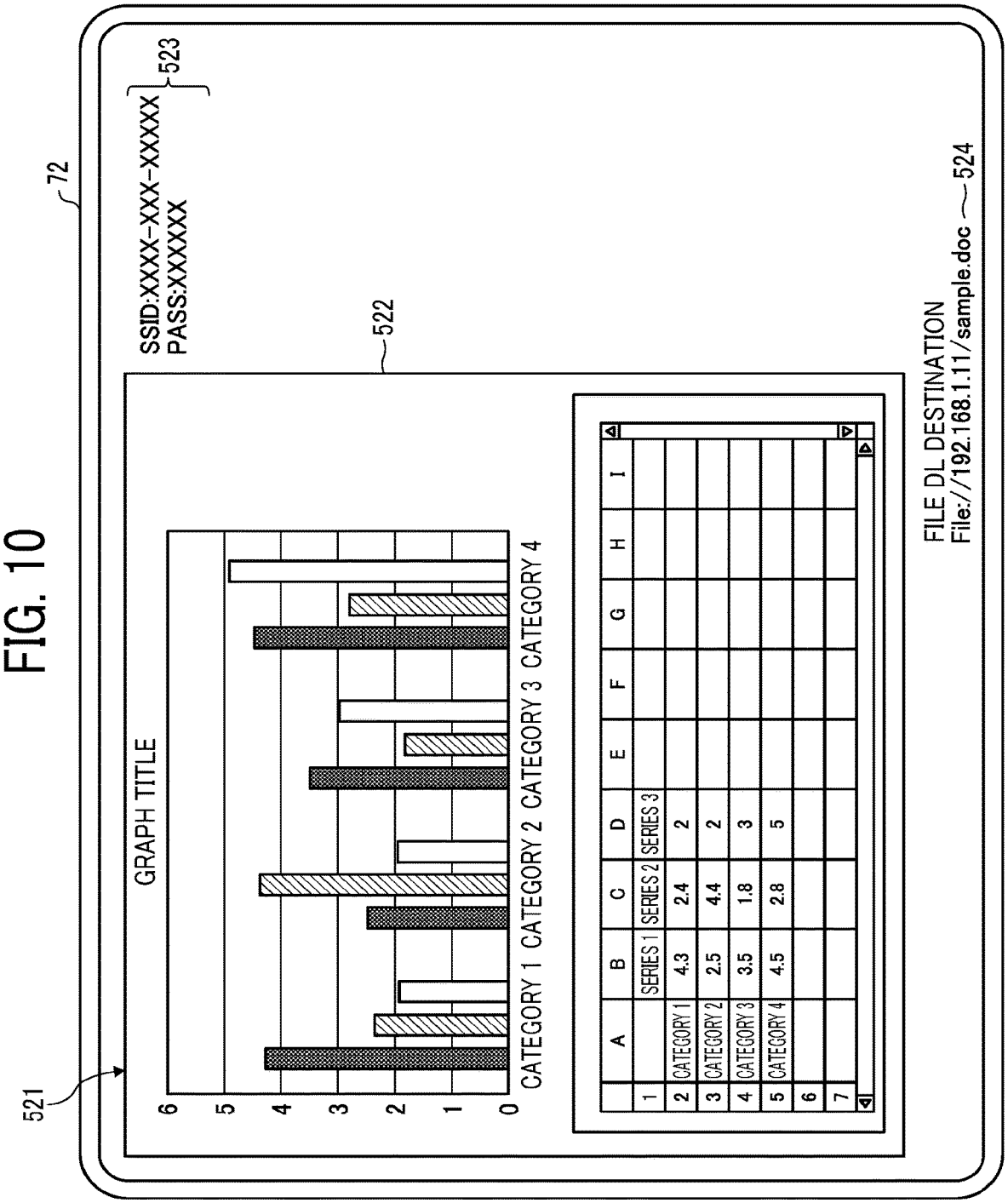
FIG. 10 is a diagram illustrating an example of a material data display screen displayed by the image display apparatus, according to an embodiment of the present disclosure.

S16.3.2.1: The display processing unit 77 displays the material data on the display 72. The display processing unit 77 also displays the connection information and the URL indicating the acquisition destination of the material data at an end of the material data, for example. A display example of the material data is illustrated in FIG. 10.

Next, the participant displays the material data on the guest terminal 30.

S17: The participant sets the connection information, which is displayed on the display 72, in the guest terminal 30. The operation accepting unit 32 of the guest terminal 30 accepts setting of the connection information.

S18: Next, the participant sets the URL, which indicates the acquisition destination of the material data and is displayed on the display 72, in the guest terminal 30. The operation accepting unit 32 of the guest terminal 30 accepts setting of the URL.

S18.1: The third communicating unit 33 of the guest terminal 30 communicates with the image display apparatus 70 by specifying the URL indicating the acquisition destination of the material data as a communication destination. The server unit 75 of the image display apparatus 70 transmits the material data, which is specified by the URL indicating the acquisition destination of the material data, to the guest terminal 30.

S19: When the meeting is finished, the participant performs an operation to check out. For example, the participant presses a check-out button that is displayed after the check-in.

S19.1: The check-in accepting unit 12 of the terminal device 10 accepts the check-out, and transmits a check-out request to the meeting reservation system 50. The check-out request includes the information used to identify the reservation information (for example, the event ID or the combination of the meeting room ID and the time). In response to the check-out request, the meeting reservation system 50 transmits a check-out success notification to the terminal device 10.

S19.2: The first communicating unit 11 of the terminal device 10 receives the check-out success notification, and the first short-range communicating unit 17 transmits the check-out notification to the image display apparatus 70. The check-out notification can be transmitted by the wireless LAN.

S19.2.1: The second short-range communicating unit 74 of the image display apparatus 70 receives the check-out success notification, and transmits to the access-point functioning unit 73 the check-out success notification. In response to receiving the check-out success notification, the access-point functioning unit 73 stops operating as the access point, and disconnects the local network LN. The server unit 75 deletes the material data.

As described above, in the communication system 1 according to the present embodiment, the image display apparatus 70 can automatically display the material data when the participant checks in.

Material Data Displayed by Image Display Apparatus 70

FIG. 10 is an example of a material data display screen displayed by the image display apparatus 70. In the material data display screen, material data 522, connection information 523, and a URL 524 indicating the acquisition destination of the material data are displayed. Thus, the participant can share the material data on the guest terminal 30 by using the connection information and the URL.

In principle, in the case where the image display apparatus 70 is the Web server, the material data displayed by the guest terminal 30 is not saved. Meanwhile, in the case where the image display apparatus 70 is the FTP server, the file can be saved. Thus, the image display apparatus 70 preferably switches a distribution method in accordance with confidentiality of the material data. For example, a degree of the confidentiality is included in the file name or extension, and the image display apparatus 70 switches the distribution method on the basis of the degree of the confidentiality. Alternatively, in the case where the degree of the confidentiality, which is set by the person who makes the reservation, is explicitly included in the reservation information, the terminal device 10 transmits such information with the material data to the image display apparatus 70.

In the conventional technology, participants cannot share the material data. In other words, in order to allowing each of the participants to view the material data in the conventional technology, the material data has to be printed, and it takes time and cost to print the material data for the number of the participants.

As it has been described so far, in the communication system 1 according to the present embodiment, when a meeting is held, the local network LN is set up for the purpose of improving the security. In such a state, the material data can be shared. In addition, the material data can also be shared by using the guest terminal 30 used by the participant. Because the connection information is changed each time a meeting is held, security can be improved.

Variations

The above-described embodiment is illustrative and do not limit the present disclosure. Thus, numerous additional modifications and variations are possible in light of the above teachings.

Example of Device Provided in Facility

For example, as illustrated in FIG. 11, the terminal device 10 and the image display apparatus 70, which have been described in the present embodiment, may be integrated. FIG. 11 is a schematic configuration diagram of the communication system 1. In FIG. 11, an electronic whiteboard 1000 as an integrated device of the terminal device 10 and the image display apparatus 70 is provided in the meeting room 9. The electronic whiteboard 1000 displays the material data acquired from the meeting reservation system 50 by itself. In addition, the electronic whiteboard 1000 operates as the access point and displays the URL indicating the connection information and the acquisition destination of the material data. Thus, the guest terminal 30 can share the material data.

(1) The electronic whiteboard 1000 acquires the reservation information of the meeting room of the day, for example, from the meeting reservation system 50 in advance.

(2) The participant comes to the meeting room 9 and performs the check-in operation.

(3) When the check-in is successful, the electronic whiteboard 1000 acquires the material data to be used at the meeting from the meeting reservation system 50.

(4) When the check-in is successful, the electronic whiteboard 1000 is operated as the access point. The electronic whiteboard 1000 displays the connection information (for example, the SSID and the encryption key) that is used to connect to the access point on a display.

(5) Meanwhile, the participant brings the guest terminal 30 into the meeting room 9. Thus, when the connection information displayed by the electronic whiteboard 1000 is set in the guest terminal 30, the guest terminal 30 can acquire and display the material data.

The URL indicating the acquisition destination of the material data is not limited to a resource held by the image display apparatus 70, and may indicate a resource on the network. For example, the material data may be stored in a storage device on an intra-company LAN.

The functional configurations of the meeting reservation system 50, the terminal device 10, the image display apparatus 70, and the guest terminal 30 are divided in to the functional blocks as illustrated in FIG. 4, for example, based on main functions thereof, in order to facilitate understanding of the processes by the meeting reservation system 50, the terminal device 10, the image display apparatus 70, and the guest terminal 30. No limitation is intended by how the processes are divided or by the name of the processes. The functions or processes implemented by the meeting reservation system 50, the terminal device 10, the image display apparatus 70, and the guest terminal 30 can be divided to a larger number of functional blocks or processes depending on the contents of the processes. Further, one process can be divided to include a larger number of processes.

The communication system 1 can include a plurality of meeting reservation systems 50 and a plurality of the schedule managing systems 60. Further operations or functions of each of the meeting reservation system 50 and the schedule managing system 60 can be distributed over a plurality of information processing apparatuses.

According to one or more embodiments of the present disclosure, the communication system is provided that allows a user to share information such as material data.

The meeting reservation system 50 is an example of the first information processing apparatus. The image display apparatus 70 is an example of the second information processing apparatus. The terminal device 10 and the image display apparatus 70 or the electronic whiteboard 1000 in the meeting room 9 is an example of the device provided in the facility. The reservation managing unit 53 is an example of use start receiving means. The material data managing unit 52 is an example of information transmitting means. The material data acquiring unit 13 is an example of information receiving means. The display processing unit 77 is an example of display processing means. The check-in accepting unit 12 is an example of use permission acquiring means. The first short-range communicating unit 17 is an example of transmitting means. The second short-range communicating unit 74 is an example of receiving means. The access-point functioning unit 73 is an example of communication path forming means.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A communication system, comprising:
a first information processing apparatus including a memory storing each of a plurality of reservation information items of a facility in association with corresponding material information to be used at the facility; and
circuitry configured to
receive identification information of a particular reservation information item and a notification indicating a start of use of the facility based on a successful authentication of a user,
directly in response to receiving the notification indicating the start of use of the facility,
set up a second communication path with the circuitry operating as a software access point and generate connection information for the access point allowing another device to connect to the access point and communicate with the circuitry via the second communication path, wherein the circuitry starts transmitting the connection information only in response to receiving the notification, and
request, from the first information processing apparatus, particular material information associated in the memory with the particular reservation information item, and receive the particular material information from the first information processing apparatus, and
display the received particular material information together with the generated connection information for the access point and a URL indicating an acquisition destination of the displayed particular material information, so that another user of another device can acquire the particular material information to be displayed on the another device, by inputting the displayed connection information for the access point and the displayed URL,
wherein the circuitry is further configured to generate the connection information directly in response to receiving the notification indicating the start of use of the facility, the connection information including a service set identifier (SSID), and display the SSID with the URL.

2. The communication system according to claim 1, further comprising:
a terminal device that is communicable with the first information processing apparatus, and a second information processing apparatus that is communicable with the terminal device via a first communication path,
wherein the circuitry includes first circuitry of the terminal device and second circuitry of the second information processing apparatus,
the first circuitry of the terminal device being configured to
transmit the notification indicating the start of use of the facility to the first information processing apparatus;
receive a permission of start of use of the facility from the first information processing apparatus; and
transmit the permission of start of use of the facility to the second information processing apparatus via the first communication path,
the second circuitry of the second information processing apparatus being configured to receive the permission of start of use of the facility via the first communication path; and in response to receiving the permission of start of use of the facility, set up the second communication path that allows the another device to communicate with the second information processing apparatus by using the connection information, and the terminal device transmits the particular material information to the second information processing apparatus via the second communication path.

3. The communication system according to claim 2, wherein:

the second circuitry of the second information processing apparatus is further configured to set up the second communication path, which is connected to using the connection information, the connection information for the access point being uniquely generated each time the second circuitry of the second information processing apparatus receives the permission of start of use of the facility.

4. The communication system according to claim 2, wherein:

the second circuitry of the second information processing apparatus is further configured to:

have a server function to distribute the information received from a terminal device; and display the URL indicating an acquisition destination of the particular material information, and the server function transmits the information to the another device when the another device connects to the URL indicating the acquisition destination of the particular material information.

5. The communication system according to claim 2, wherein:

the first circuitry of the terminal device is further configured to:

transmit a notification indicating termination of use of the facility to the first information processing apparatus;

receive acceptance of the termination of use of the facility from the first information processing apparatus; and transmit the acceptance of the termination of use of the facility to the second information processing apparatus via the first communication path, and the second circuitry of the second information processing apparatus is further configured to:

receive the acceptance of the termination of use of the facility via the first communication path; and in response to receiving the acceptance of the termination of use of the facility, disconnect the second communication path.

6. The communication system according to claim 5, wherein the second circuitry of the second information processing apparatus is further configured to delete the particular material information in response to receiving the acceptance of the termination of use of the facility.

7. The communication system according to claim 2, wherein the second information processing apparatus is an apparatus configured by a stick-type personal computer (PC) and a display connected to the stick-type PC.

8. The communication system of claim 1, wherein the circuitry starts transmitting a beacon including the connection information only in response to receiving the notification.

9. A communication method performed by a communication system that includes a first information processing apparatus including a memory storing each of a plurality of reservation information items of a facility in association with corresponding material information to be used at the facility, the communication method comprising:

receiving identification information of a particular reservation information item and a notification indicating a start of use of the facility based on a successful authentication of a user;

directly in response to receiving the notification indicating the start of use of the facility, setting up a second communication path with a software access point and generating connection information for the access point allowing another device to connect to the access point and communicate via the second communication path, wherein the setting step includes starting transmission of the connection information only in response to receiving the notification, and requesting, from the first information processing apparatus, particular material information associated in the memory with the particular reservation information item;

receiving the particular material information from the first information processing apparatus; and displaying the received particular material information together with the generated connection information for the access point and a URL indicating an acquisition destination of the displayed particular material information, so that another user of another device can acquire the particular material information to be displayed on the another device, by inputting the displayed connection information for the access point and the displayed URL, wherein the generating the connection information is performed directly in response to receiving the notification indicating the start of use of the facility, the connection information including an encryption key, and wherein the displaying performs displaying the encryption key with the URL.

10. An apparatus, comprising:

circuitry configured to receive identification information of a particular reservation information item and a notification indicating a start of use of a facility based on a successful authentication of a user, directly in response to receiving the notification indicating the start of use of the facility, set up a communication path with the circuitry operating as a software access point and generate connection information for the access point allowing another device to connect to the access point and communicate with the circuitry via the communication path, wherein the circuitry starts transmitting the connection information only in response to receiving the notification, and request, from an information processing apparatus, particular material information associated in a memory of the information processing apparatus with the particular reservation information item, and receive the particular material information from the information processing apparatus, and display the received particular material information together with the generated connection information for the access point and a URL indicating an acquisition destination of the displayed particular material information, so that another user of another device can acquire the particular material information to be displayed on the another device, by inputting the displayed connection information for the access point and the displayed URL, wherein the circuitry is further configured to generate the connection information directly in response to receiving the notification indicating the start of use of the facility, the connection information including an encryption key, and display the encryption key with the URL.

\* \* \* \* \*